United States Patent [19]
Perlov et al.

[11] Patent Number: 4,667,260
[45] Date of Patent: May 19, 1987

[54] THIN FILM VERTICAL RECORDING HEAD

[75] Inventors: Craig M. Perlov, Bloomington; Arthur Calderon, Jr., Minnetonka, both of Minn.

[73] Assignee: Magnetic Peripherals Inc., Minneapolis, Minn.

[21] Appl. No.: 841,654

[22] Filed: Mar. 20, 1986

[51] Int. Cl.$^4$ .......................... G11B 5/22; G11B 5/20
[52] U.S. Cl. .................................. 360/122; 360/123
[58] Field of Search ............... 360/122, 119, 120, 123

[56] References Cited
FOREIGN PATENT DOCUMENTS
2126408 3/1984 United Kingdom ............... 360/122

Primary Examiner—John H. Wolff
Attorney, Agent, or Firm—J. A. Genovese; R. M. Angus

[57] ABSTRACT

A vertical recording head includes a W-shaped core, a substrate carrying a thin film probe supported in one slot of the core, and a shield coil wound in the slots to hold the substrate and assemblage together. A non-magnetic cap forms the surface of the head over the cap, with the arrangement being such that the probe extends through the cap so the magnetic gap is as small as possible.

1 Claim, 3 Drawing Figures

THIN FILM VERTICAL RECORDING HEAD

This invention relates to magnetic recording heads and particularly heads useful for vertical or perpendicular recording.

Vertical recording is characterized by the orientation of magnetic bipoles perpendicular or orthogonal to the plane of the surface of the magnetic media. It is important in vertical magnetic recording heads that the probe of the head be as small as possible to provide a concentrated magnetic flux. Additionally, the head should be easily assembled to form a magnetic head.

The present invention provides a vertical recording head having a thin probe, constructed of thin film techniques, which is easily assembled to the cores of the head.

One feature of the invention resides in the formation of the probe on an insulated substrate which is supported by the shield coil of the head for efficient packaging.

The above and other features of this invention will be more fully understood from the following detailed description, and the accompanying drawings, in which.

Figure 1:
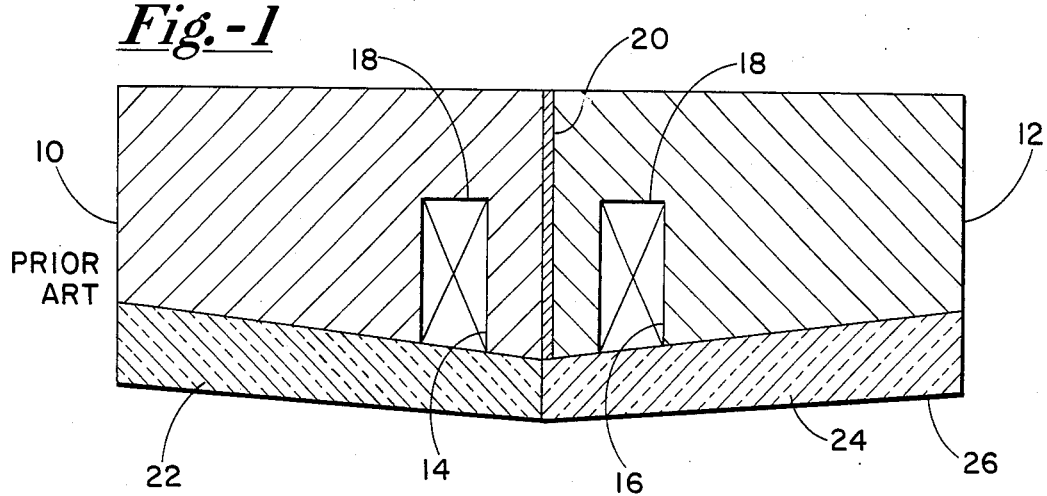
FIG. 1 is a section view of a prior art vertical recording head.

FIG. 1 illustrates a vertical recording read/write head in accordance with the prior art wherein a pair of U-shaped side cores 10 and 12 have slots 14 and 16 to receive coil 18. Probe 20 is sandwiched between cores 10 and 12, and the entire assemblage is capped with non-magnetic caps 22 and 24 whose frontal surface 26 is lapped. The principal problem with the device shown in FIG. 1 was its difficulty of assembly and the comparably thick probe 20 employed.

Figure 2:
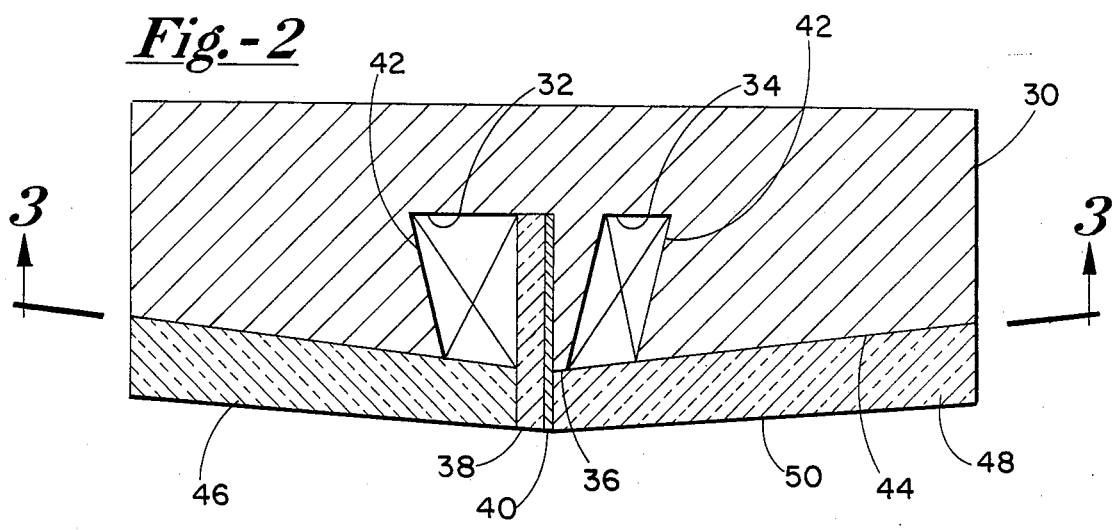
FIG. 2 is a section view of a vertical recording head in accordance with the presently preferred embodiment of the present invention.
Figure 3:
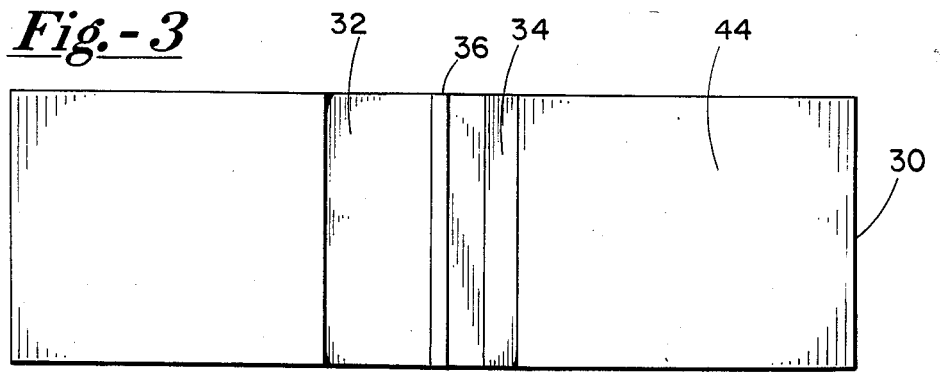
FIG. 3 is a plan view, taken generally at line 3—3 in FIG. 2, of the face of the core forming the head illustrated in FIG. 2.

FIGS. 2 and 3 illustrate a magnetic read/write head in accordance with the present invention wherein a single W-shaped ferrite core 30 has a pair of slots 32 and 34. FIG. 3 is a plan view of the face of the core 30 taken generally along line 3—3, but without the coils, probe and substrate in accordance with the present invention.

As formed, slots 32 and 34 form a land 36 between them. Also, it is preferred that at least the remote or outside surfaces of slots 32 and 34 would be somewhat slopped as shown.

A substrate 38, constructed of suitable non-magnetic material, such as glass, has a thin film of metal 40 deposited on one surface thereof. The layer 40 of thin film metal is preferably deposited to a thickness of between about 200 and 1,000 Angstroms and will form the ultimate probe of the magnetic head. In the assembly of the head in accordance with the present invention, the substrate bearing probe 40 is positioned within slot 32 so that probe 40 abuts land 36. The remaining portions of slots 32 and 34 are wound with a shield coil 42 to form the necessary read/write coil for the magnetic head. Preferably, during the assembly, the substrate 38 and deposited probe 40 extend beyond the bounds of surface 44 of core 30. Non-magnetic cap 46 and 48 is then supported on surface 44 of the core and ground smooth and lapped to form the frontal surface 50 of the head. During the lapping process, the end of substrate 38 and probe 40 are lapped flush with surface 50 of the non-magnetic cap.

The head constructed in accordance with the present invention is efficient in operation and easily assembled.

This invention is not to be limited by the embodiment shown in the drawings and described in the description, which is given by way of example and not of limitation, but only in accordance with the scope of the appended claim.

What is claimed is:

1. A magnetic read/write head for vertical recording comprising a substantially W-shaped body consisting of a single piece of magnetically conductive material having first and second grooves cut into a surface thereof; an insulating substrate; a thin film probe deposited onto said substrate; said substrate and probe being positioned in said first groove and protruding therefrom beyond said surface of said body; a shield coil supported in said first and second grooves, said shield coil being wrapped around the substrate and probe within said first groove and that portion of said body between said first and second grooves; and a non-magnetic cap supported by the said surface of said body, an end of said substrate and probe forming a frontal surface of said head flush with a surface of said cap.

* * * * *